United States Patent
Katsurabayashi et al.

(10) Patent No.: US 7,305,405 B2
(45) Date of Patent: Dec. 4, 2007

(54) INFORMATION PROVIDING SYSTEM AND INFORMATION PROVIDING METHOD

(75) Inventors: Hiroshi Katsurabayashi, Kawasaki (JP); Fumitaka Matsumoto, Kawasaki (JP); Takashi Noguchi, Kawasaki (JP); Nobuo Suzuki, Kawasaki (JP); Akira Kurosawa, Kawasaki (JP); Nobuyuki Takeo, Kawasaki (JP); Toru Ishigaki, Kawasaki (JP); Motoyuki Takaai, Kawasaki (JP); Shoichi Hayashi, Kawasaki (JP); Takanao Sasaki, Kawasaki (JP)

(73) Assignee: Fuji Xerox Co. Ltd., Tokyo (JP)

( * ) Notice: Subject to any disclaimer, the term of this patent is extended or adjusted under 35 U.S.C. 154(b) by 531 days.

(21) Appl. No.: 10/834,200

(22) Filed: Apr. 29, 2004

(65) Prior Publication Data

US 2005/0060333 A1  Mar. 17, 2005

(30) Foreign Application Priority Data

Sep. 16, 2003  (JP)  ............................. 2003-322479

(51) Int. Cl.
*G06F 7/00* (2006.01)
(52) U.S. Cl. .......................................... 707/101; 707/7
(58) Field of Classification Search ................ 707/101, 707/7
See application file for complete search history.

(56) References Cited

U.S. PATENT DOCUMENTS

| | | | | |
|---|---|---|---|---|
| 6,018,344 A | * | 1/2000 | Harada et al. | ............... 715/818 |
| 6,075,536 A | * | 6/2000 | Kunieda et al. | ............ 715/848 |
| 6,691,136 B2 | * | 2/2004 | Lee et al. | ................... 707/200 |
| 6,968,364 B1 | * | 11/2005 | Wong et al. | ................. 709/217 |
| 7,031,961 B2 | * | 4/2006 | Pitkow et al. | .................. 707/4 |

FOREIGN PATENT DOCUMENTS

JP  A 2003-30216  1/2003

* cited by examiner

*Primary Examiner*—Don Wong
*Assistant Examiner*—Angela M Lie
(74) *Attorney, Agent, or Firm*—Oliff & Berridge, PLC

(57) ABSTRACT

An information storage unit stores pieces of information that are classified on the basis of their relationships. An information providing unit provides a client terminal with information stored in the information storage unit via a communication network in response to an access request from the client terminal. An access frequency acquiring unit acquires access frequencies, for respective classification items of the pieces of information, of accesses to the pieces of information. An information generating unit generates prescribed information so that pieces of information of plural classification items will be displayed in the client terminal in such a form as to be based on histories of the access frequencies.

10 Claims, 6 Drawing Sheets

INFORMATION PROVIDING SYSTEM AND INFORMATION PROVIDING METHOD

BACKGROUND OF THE INVENTION

1. Field of the Invention

The present invention relates to a system for providing a client terminal with information that is transmitted from a server apparatus via a communication network. In particular, the invention relates to a system capable of realizing what is called a virtual community such as an electronic bulletin board or a mailing list in which information is shared by plural client terminals.

2. Description of the Related Art

Systems are known in which what is called a virtual community is constructed on a communication network such as the Internet or an intranet and information about various topics is shared and opinions on those topics (themes) are exchanged. In this kind of virtual community, pieces of information are classified on the basis of their relationships. In each client terminal, sets of pieces of information are displayed in prescribed form separately on a classification item basis. Each user sees displayed information of a certain classification item and thereby acquires that information, and joins a discussion corresponding to that classification item by sending information and thereby adding it to existing pieces of information of that classification item. A conventional technique of this kind is disclosed in JP-A-2003-30216, for example.

In this kind of virtual community, information that has been added relatively recently may be displayed in such a manner that it is associated with such a word as "hot," "new," or "update." This method of display is convenient because it allows users to acquire new information easily.

However, only with such a display, users cannot understand the actual situation of information exchange of the classification item to which the information belongs. That is, even if the information was added recently, there is a probability that no information had been added for a long time before then for the classification item and actually the classification item does not attract much interest and is less important to users.

Further, users cannot understand the situation of information or a classification item that is associated with no such indication unless they refer to more detailed information.

If systems of the above kind allowed users to understand the information exchange situation etc. of each classification item more easily and quickly, they would be more convenient to users and various kinds of work and business operations utilizing virtual communities would become more efficient.

SUMMARY OF THE INVENTION

The present invention has been made in view of the above circumstances, and provides an information providing system that realizes a virtual community on a communication network and in which display is performed in accordance with transition phases of access situations of classification items of pieces of information.

According to one aspect of the invention, an information providing system includes an information storage unit for storing pieces of information that are classified on the basis of relationships between them; an information providing unit for providing a client terminal with information stored in the information storage unit via a communication network in response to an access request from the client terminal; an access frequency acquiring unit for acquiring access frequencies, for respective classification items of the pieces of information, of accesses to the pieces of information; and an information generating unit for generating prescribed information so that pieces of information of plural classification items will be displayed in the client terminal in such a form as to be based on histories of the access frequencies.

According to another aspect of the invention, an information providing system includes an information storage unit for storing pieces of information that are classified on the basis of relationships between them; an information providing unit for providing a client terminal with information stored in the information storage unit via a communication network in response to an access request from the client terminal; a transition index acquiring unit for acquiring transition indices indicating transition phases of access situations of classification items of the pieces of information on the basis of access frequencies, for the respective classification items, of accesses to the pieces of information; and an information generating unit for generating prescribed information so that display will be performed in the client terminal in such a form as to be based on the transition indices.

According to still another aspect of the invention, an information providing method that is practiced on an information providing system for providing each client terminal with prescribed information from a server apparatus via a communication network, includes the steps of an information storage unit's storing pieces of information that are classified on the basis of relationships between them; an information providing unit's providing a client terminal with information stored in the information storage unit via the communication network in response to an access request from the client terminal; a transition index acquiring unit's acquiring transition indices indicating transition phases of access situations of classification items of the pieces of information on the basis of access frequencies, for the respective classification items, of accesses to the pieces of information; and an information generating unit's generating prescribed information so that display will be performed in the client terminal in such a form as to be based on the transition indices.

According to a further aspect of the invention, a storage medium readable by a computer is provided, the storage medium storing a program of instructions executable by the computer in an information providing system for providing each client terminal with prescribed information from a server apparatus via a communication network, the program causing the computer to function as an information storage unit for storing pieces of information that are classified on the basis of relationships between them; an information providing unit for providing a client terminal with information stored in the information storage unit via the communication network in response to an access request from the client terminal; a transition index acquiring unit for acquiring transition indices indicating transition phases of access situations of classification items of the pieces of information on the basis of access frequencies, for the respective classification items, of accesses to the pieces of information; and an information generating unit for generating prescribed information so that display will be performed in the client terminal in such a form as to be based on the transition indices.

BRIEF DESCRIPTION OF THE DRAWINGS

Preferred embodiments of the present invention will be described in detail based on the following figures, wherein.

DESCRIPTION OF THE PREFERRED EMBODIMENTS

Figure 1:
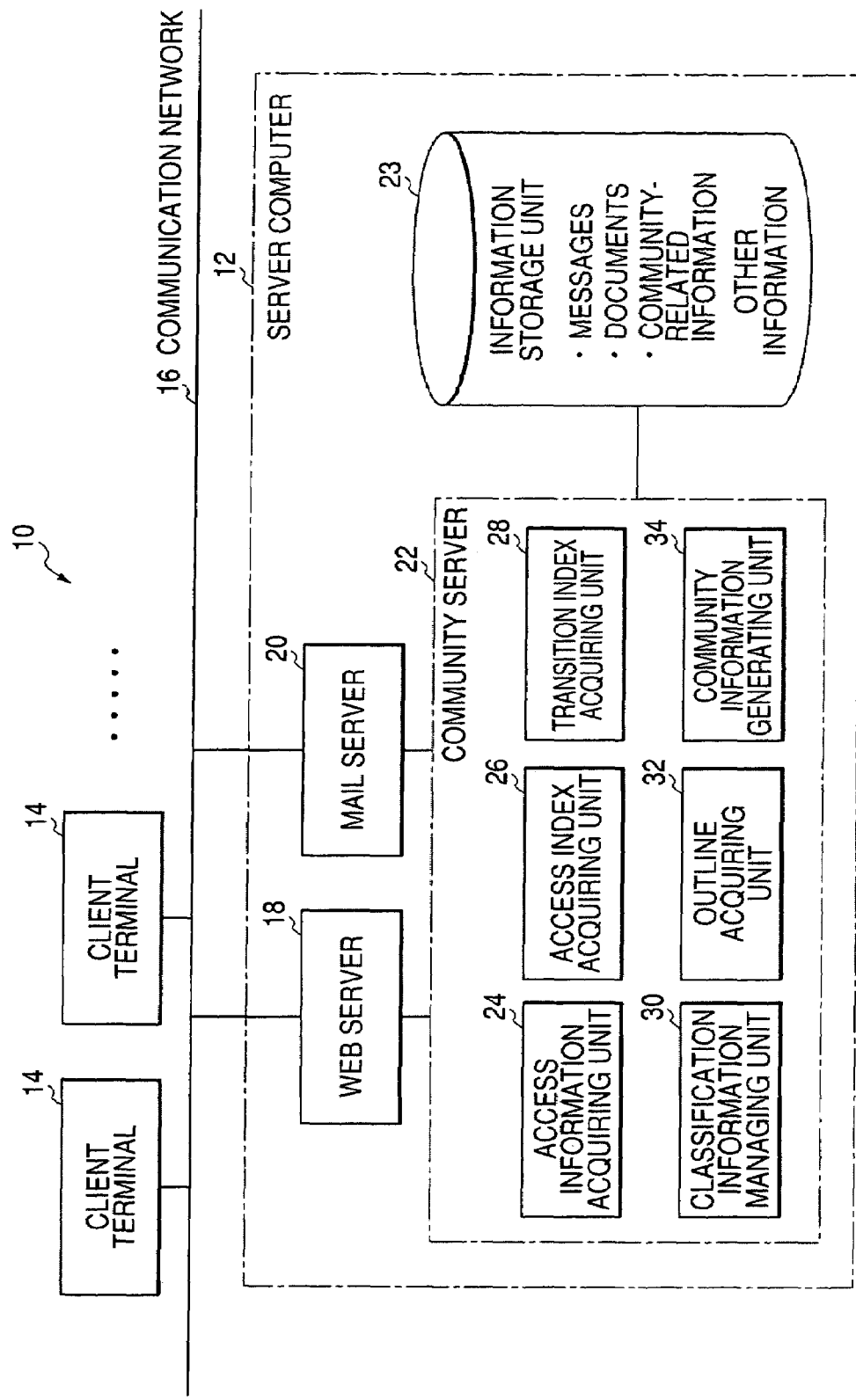
FIG. 1 shows an exemplary general configuration of an information providing system according to an embodiment of the present invention.

A preferred embodiment of the present invention will be hereinafter described. FIG. 1 shows an exemplary general configuration of an information providing system 10 according to the embodiment.

The information providing system 10 according to the embodiment includes a server computer 12 and plural client terminals 14 that are connected to the server computer 12 via a communication network 16.

A web browser and/or a mailer (each of which is a program) installed in each client terminal functions in each client terminal 14 and thereby each client terminal 14 operates as a web client and/or a mail client. Each client terminal 14 can send information to each community that is managed by a community server 22 of the server computer 12 by specifying a URL (uniform resource locator) on the web browser or sending a mail on the mailer. Further, each client terminal 14 can acquire shared information from the server computer 12 and output it on the web browser or the mailer by specifying a URL on the web browser or receiving a mail on the mailer. In this manner, each user can join a virtual community on the network from his or her client terminal 14.

Each client terminal 14 is equipped with a control unit (CPU or the like), storage units (memory, hard disk drive, etc.), input units (mouse, keyboard, microphone, etc.), and output units (display, speaker, printer, etc.) (none of those units are shown). In each client terminal 14, each piece of processing is performed by the control unit (not shown) according to a software program (web browser or mailer program) that is retained by a program retaining unit such as the hard disk drive or the memory (not shown). The software program is installed and retained by the program retaining unit after being read from a computer-readable storage medium by a removable device (CD-ROM device, MO device, or the like; not shown) or being acquired via the network.

On the other hand, respective software programs of a web server 18, a mail server 20, and the community server 22 operate on the server computer 12. The server computer 12 is also equipped with an information storage unit (e.g., hard disk drive) 23 for storing various kinds of information such as messages transmitted from the client terminals 14, documents (attachment files etc.), and community-related information.

Figure 2:
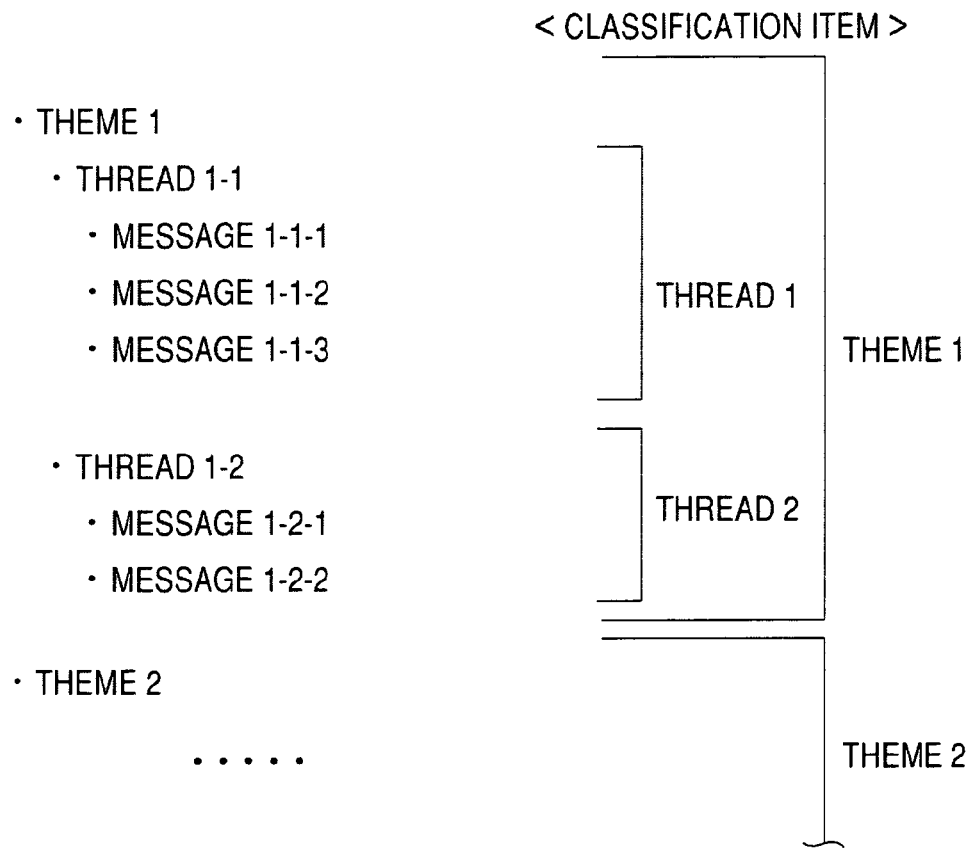
FIG. 2 shows an exemplary structure of classified pieces of information.
Figure 3:
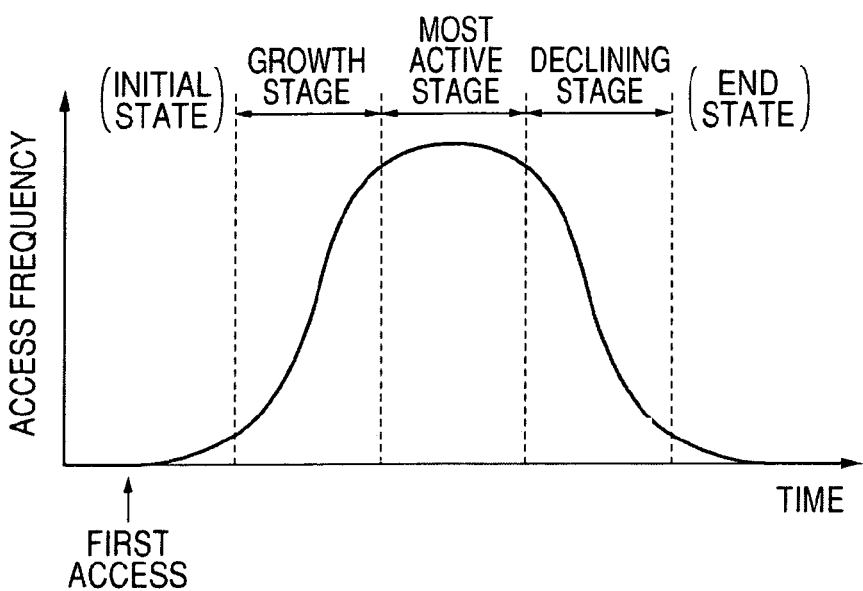
FIG. 3 schematically shows an exemplary manner of transition of the access frequency of one classification item.
Figure 4:
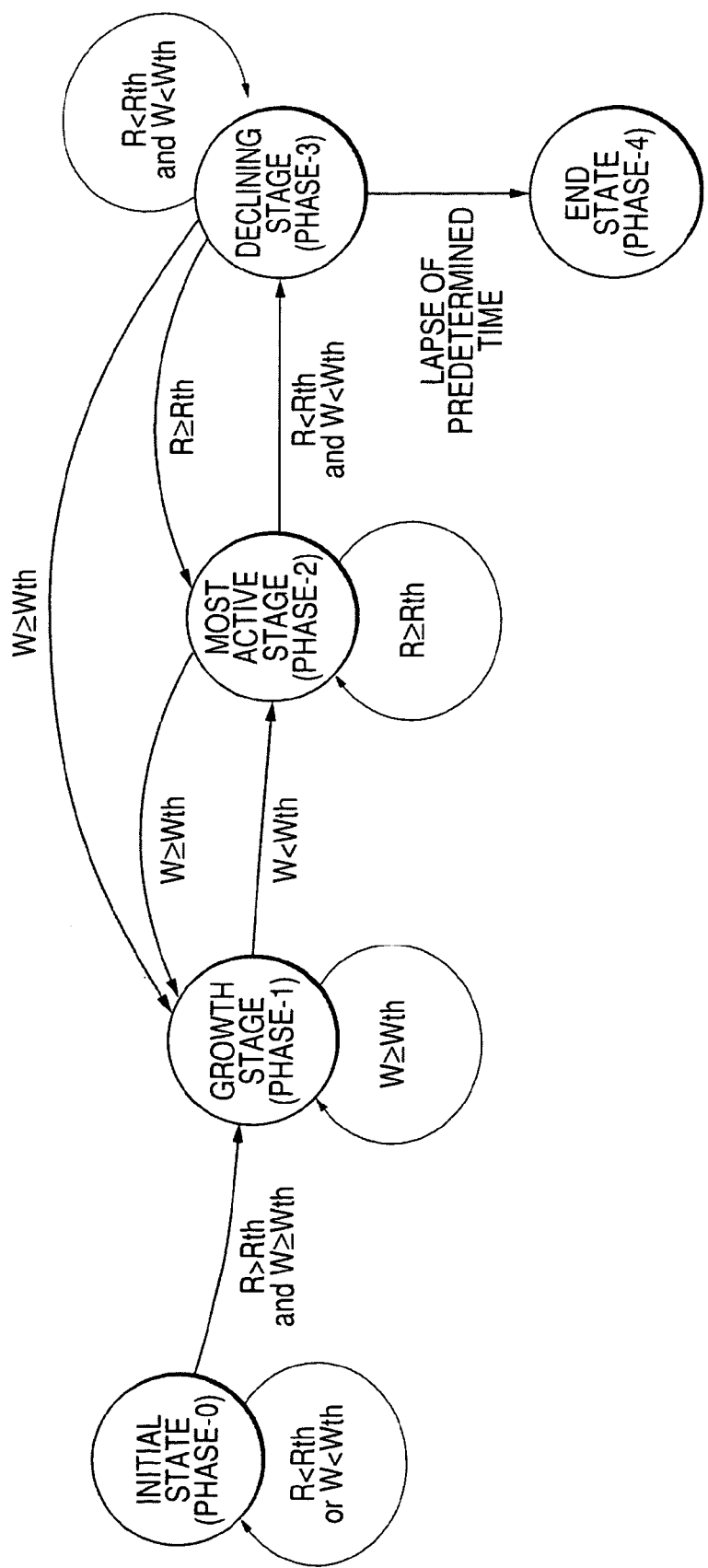
FIG. 4 shows an example of manners and conditions of phase transitions that occur in accordance with the access situation in the information providing system according to the embodiment.
Figure 5:
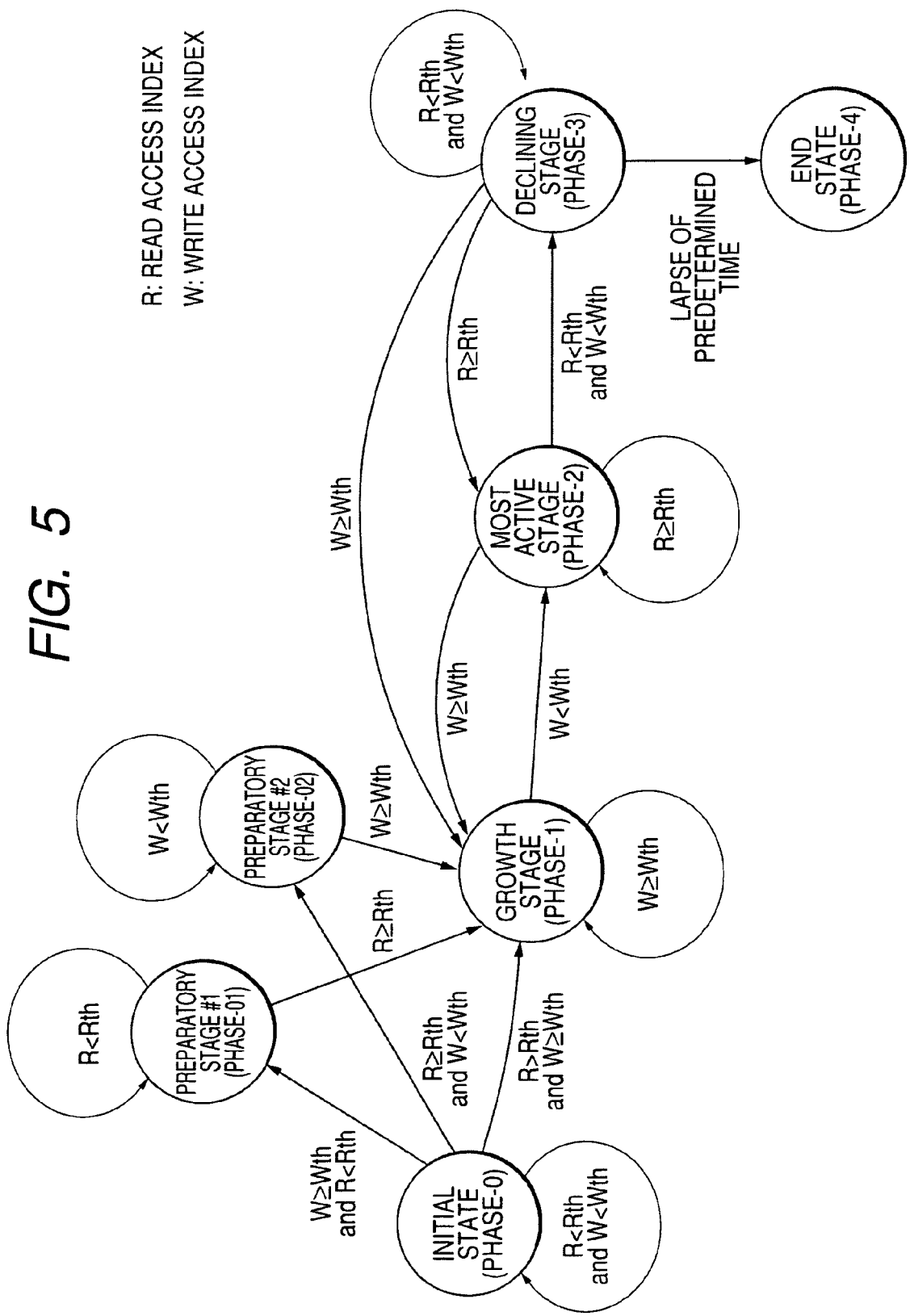
FIG. 5 shows another example of manners and conditions of phase transitions that occur in accordance with the access situation in the information providing system according to the embodiment.
Figure 6:
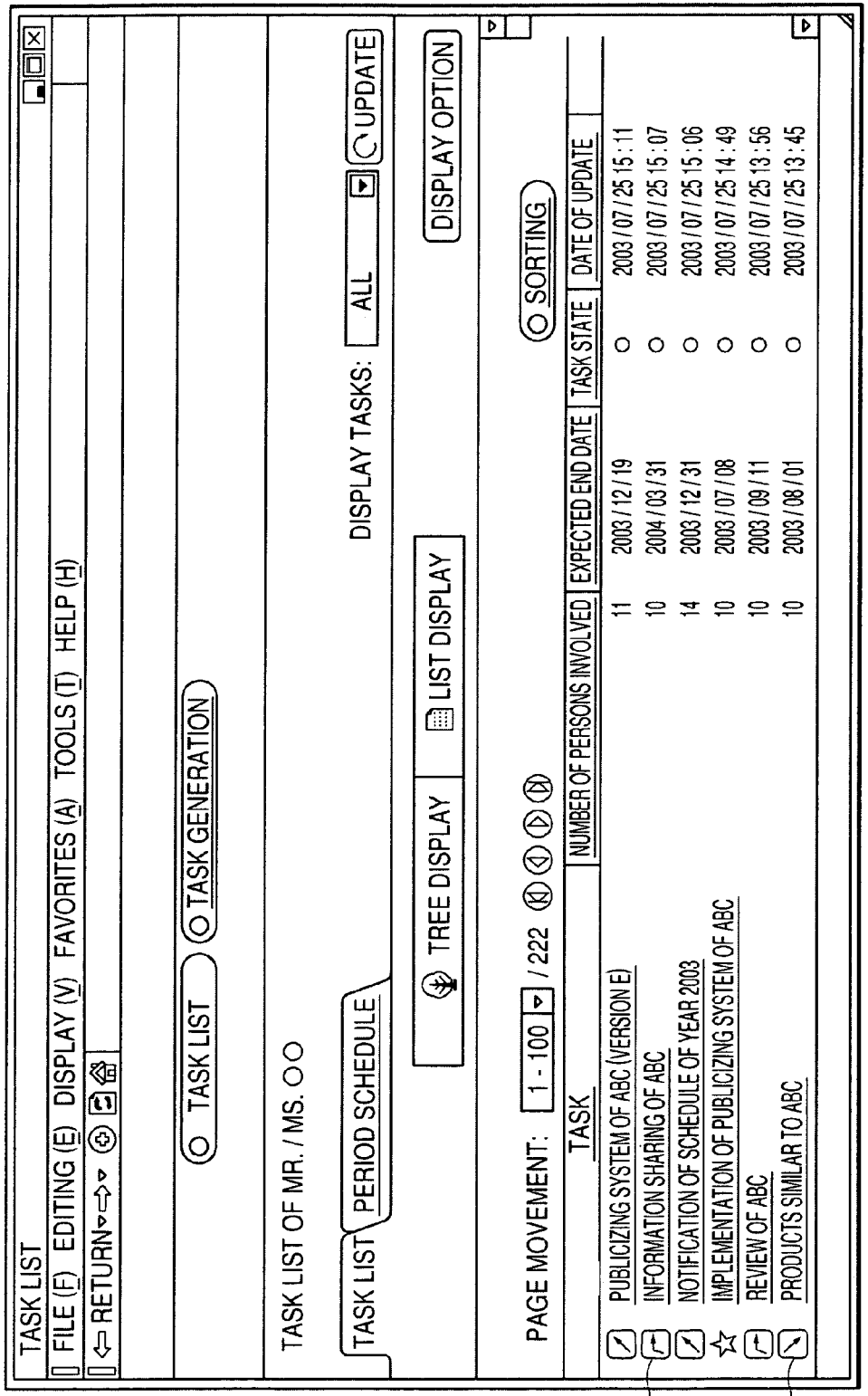
FIG. 6 shows an exemplary picture (i.e., a picture in which plural classification items are displayed in list form) that is displayed on a client terminal of the information providing system according to the embodiment of the invention.

The community server 22 includes an access information acquiring unit 24, an access index acquiring unit 26, a transition index acquiring unit 28, a classification information managing unit 30, an outline acquiring unit 32, and a community information generating unit 34. The operation of each unit will be described below with reference to the drawings. FIG. 2 shows an exemplary structure of pieces of information. FIG. 3 shows an exemplary manner of transition of the access frequency of one classification item. FIGS. 4 and 5 show examples of manners and conditions of phase transitions that occur in accordance with access situations. FIG. 6 shows an exemplary picture that is displayed on each client terminal 14.

In the community server 22, pieces of information are classified on the basis of their relationships. For example, as shown in FIG. 2, if a thread on a virtual community (e.g., electronic bulletin board) includes plural messages, those messages are classified as belonging to the same thread. If a certain theme includes plural threads, all the messages in those threads are classified as belonging to the same theme. It is also possible to classify pieces of information using an attribute (e.g., an attribute of a sender (contributor) of a message such as a section he or she belongs to) that spans threads or themes.

The access information acquiring unit 24 acquires, from the web server 18 or the mail server 20 (or the information storage unit 23), information indicating the state of access to each piece of information. The term "access" as used herein includes reading (reference) and writing (addition of information). The access information acquiring unit 24 also acquires, for each access, such information as an access type (reading or writing), the degree of access (e.g., a title list was merely referred to or a message or an attachment document was opened), and an account of a party who made the access.

The access index acquiring unit 26 acquires access indices of respective classification items. The term "access index" as used herein means a numerical index indicating an access frequency of the classification item. The access frequency means the number of accesses in a prescribed period (e.g., one day, several days, one week, or one month). In acquiring an access index, weighting may be done in accordance with the attributes of parties who made access. For example, in acquiring an access index for a certain theme, accesses of members of the theme (i.e., persons who are permitted to add a message about the theme) are weighted heavily and accesses of non-member persons are weighted lightly. That is, an access index Ap is given by $\alpha \cdot \text{Im} + \beta \cdot \text{Iv}$ ($\alpha > \beta$, $\alpha + \beta = 1$), where Im is the number of accesses of members and Iv is the number of accesses of non-member persons. This makes it possible to allow the access index to reflect accesses of what persons are regarded as important. Similarly, it is possible that weighting may be done in accordance with the access types or the degrees of access so that a form of access that is regarded as important is reflected in an access index as a larger numerical value. An example of the former case is such that write access is weighted heavily and read access is weighted lightly. An example of the latter case is such that brief access that lasted for a relatively short time (e.g., only a thread or message list was referred to) is weighted lightly and deep access that lasted for a relatively long time (e.g., the contents of a lower-rank message or a related document of a thread were referred to in the case of structured pieces of information) is weighted heavily. These are just examples, and weighting may be done properly in accordance with the content of a theme or an access situation. The access frequency itself may be employed as the access index.

The transition index acquiring unit 28 acquires transition indices of the respective classification items. The term "transition index" means an index indicating a transition phase of the access situation of each classification item. As shown in FIG. 3, in general, starting from a first access (i.e., setting of a theme or a thread), the access frequency of a certain topic varies over time roughly in such a manner as to increase (a growth stage), reach a peak (a saturation or most active stage), and decrease (a declining stage). It is frequently the case that a topic in its growth or most active stage relatively attracts much attention and is important. Therefore, if it is possible to present such transition phases of the access frequencies to users, it would help users select a classification item (theme or thread) to refer to or determine priority when referring to plural classification items and would increase the speed and efficiency of work or business operations.

For the above reason, the transition index acquiring unit 28 acquires a transition index from a history of each access index. For example, the transition index acquiring unit 28 acquires an increase rate of each access index on the basis of past (i.e., recent) plural access index values. A period from a first access to a time when the increase rate decreases to a first threshold value after reaching a peak may be called phase-1 (growth stage). A period that follows phase-1 and in which the increase rate is positive and lower than the first threshold value or is negative and higher than or equal to a second threshold value may be called phase-2 (most active stage) A period that follows phase-2 and in which the increase rate is negative and lower than the second threshold value may be called phase-3 (declining stage).

A transition index may be acquired by separately taking into consideration a read (reference) access index and a write (addition) access index. FIG. 4 shows an example of such a case. In a period that starts from a first access and in which the read access index (represented simply by R in FIG. 4 and the following description relating to FIG. 4); the same applies to FIG. 5) is smaller than a prescribed threshold value Rth or the write access index (represented simply by W in FIG. 4 and the following description relating to FIG. 4); the same applies to FIG. 5) is smaller than a prescribed threshold value Wth, the transition index is set to phase-0 (initial state). The transition index is set to phase-1 (growth stage) when both of R and W have become greater than or equal to Rth and Wth, respectively, in phase-0.

From the viewpoint that W should be large in phase-1 (growth stage), a transition from phase-1 to phase-2 (most active stage) is triggered by decrease of W. That is, the transition index is set to phase-2 when W has become smaller than the threshold value Wth in phase-1. If W has increased again and become greater than or equal to the threshold value Wth though a transition was made to phase-2 or phase-3, the transition index is returned to phase-1. If W remains greater than or equal to the threshold value Wth in phase-1, the transition index is kept set to phase-1.

From the viewpoint that both of R and W should be small in phase-3 (declining stage), a transition from phase-2 to phase-3 is triggered by decrease of both of R and W. That is, the transition index is set to phase-3 when both of R and W have become smaller than the respective threshold values Rth and Wth in phase-2. If R has increased again and become greater than or equal to the threshold value Rth though a transition was made to phase-3, the transition index is returned to phase-2. If R remains greater than or equal to the threshold value Rth in phase-2, the transition index is kept set to phase-2. If the phase-3 state has lasted for a prescribed time or more, a transition is made to phase-4 (end state).

Incidentally, when a transition is made from phase-0 to phase-1, increase of R and increase of W may occur asynchronously In view of this, as shown in FIG. 5, phase-01 (preparatory stage #1: a state that is established when only W has increased in phase-0) and phase-02 ((preparatory stage #2: a state that is established when only R has increased in phase-0) may be set separately from phase-0 and phase-1. Also in this case, a transition is made from phase-0 to phase-1 when both of R and W have become greater than or equal to the threshold values Rth and Wth, respectively. Since the example of FIG. 5 is the same as the example of FIG. 4 except for phases-0, 1, 01 and 02, no further description will be made below of the example of FIG. 5.

The above transition index setting methods are just examples, and more transition phases may be defined more finely. Conversely, the number of transition phases may be smaller than in the above examples. Further, each phase may be subdivided so that, for example, discrimination can be made in the magnitude of the increase rate of the access index. The judgment criteria of transitions between phases may be set as appropriate in accordance with an actual access situation, the contents of information, and other factors, and is not limited to those in the above examples.

On the basis of the transition indices thus acquired, the community information generating unit 34 generates information (i.e., information to be transmitted to a client terminal 14 (e.g., an HTML document or a text, images, etc. for screen display)) to be used for the client terminal 14 to display information of each classification item in such a manner that its transition phase can be recognized. As a result of this processing, for example, each classification item (in the example of FIG. 6, a task) is displayed in the client terminal 14 in such a manner as to be associated with a display element 36 (e.g., an image or a text; in the example of FIG. 6, an image icon) corresponding to a phase as shown in FIG. 6. This allows the user to select a classification item to access or determine priority order of classification items to access on the basis of (the display elements 36 indicating) the phases of the respective classification items when referring to the list of classification items shown in FIG. 6. The phases of the respective classification items become easier to recognize if the community information generating unit 34 performs additional, prescribed processing so that in the client terminal 14 the spaces and the display elements 36 of the respective classification items are colored differently or their display positions are rearranged (sorted) in accordance with the respective transition indices. Classification items in the growth stage or the most active stage may be located at easiest-to-access positions on the screen (in the case of a list display as shown in FIG. 6, top positions of the list) In this case, since those classification items are ones that will be accessed at highest probabilities by many users (in particular, members of those classification items), they can be accessed quickly by individual client terminals 14 and the work efficiency can be increased as the whole community.

Each phase can be displayed in more detail by combining plural display forms. An example is as follows. A display element having the same shape is used for the growth stage (phase-1), and the color of the display element or a character string (title) or an icon indicating the classification item is varied in accordance with the increase rate of the access index (e.g., red is used when the increase rate of the access index is relative high which means rapid growth, and orange is used when the increase rate is relatively low which means gentle growth).

The classification information managing unit 30 can change the classification item and the storage form of pieces of information in accordance with the transition phase of the classification item. For example, in the examples of FIGS. 4 and 5, when a certain classification item is in phase-4 (end state), it is highly probable that leaving the pieces of information of that classification item in the information storage unit 23 as they are is wasteful, because the access frequency is low whereas the amount of information is large. In view of this, the classification information managing unit 30 selects classification items for which it is judged, on the basis of the transition indices, the elapsed times from first accesses, the access indices (and their increase rates), or the like, that they are in the end state past the most active stage and the declining stage and that the number of accesses will not increase even in the future. The classification information managing unit 30 deletes all or part of the pieces of information of those classification items. As for information to be left in the information storage unit 23, to utilize it for search, words and texts that appear at high frequencies may be extracted from the pieces of information of those classification items and left after being subjected to known summarization processing. Pieces of information that have been deleted from the information storage unit 23 may be stored in another storage medium.

In this embodiment, the classification information managing unit 30 also performs processing of automatically generating a new classification item (i.e., small classification item) in accordance with the transition phase. For example, there may occur a case that a feature of the growth stage appears again in a certain classification item in spite of the fact that it has gone through a growth stage, a most active stage, and a declining stage (e.g., the write access index increases again; a transition is made from phase-3 to phase-1 in the examples of FIGS. 4 and 5). In this case, there is a probability that the access frequency has increased for a topic that is different from the topic that was discussed actively before. In view of this, in such a case, first the classification information managing unit 30 gives another classification item (small classification item) to recent pieces of information, that is, pieces of information that were added after the access index started to increase again in the classification item concerned (e.g., after a time point of a transition from phase-3 to phase-1). Further, the outline acquiring unit 32 acquires an outline (or a title) for the new classification item. At this time, if a common title is given to threads or messages, that title may be employed as an outline of the new classification item. Alternatively, a summary acquired by performing known summarization processing on the contents (texts) of the pieces of information of the new classification item may be employed as its outline.

Figure 7:
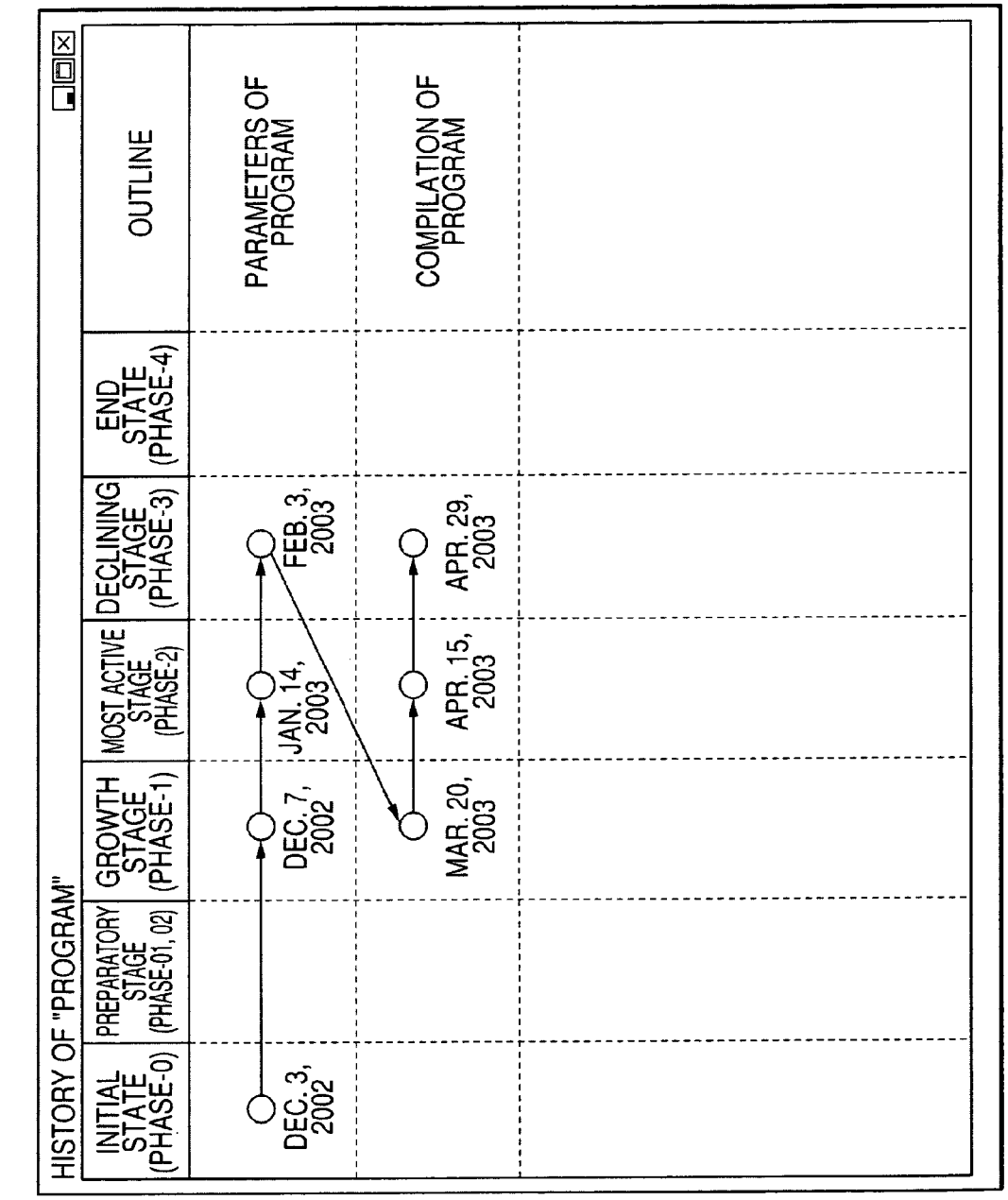
FIG. 7 shows an exemplary picture (i.e., a picture showing a history of phase transitions of a certain classification item) that is displayed on a client terminal of the information providing system according to the embodiment of the invention.

The community information generating unit 34 can also generate information indicating a history of phase transitions of each classification item. FIG. 7 shows an exemplary history of phase transitions in a case that one classification item gone through a growth stage, a most active stage, and a declining stage for one topic (in the example of FIG. 7, "parameters of program") and then gone through a growth stage, a most active stage, and a declining stage for a new topic (in the example of FIG. 7, "compilation of program"). In this example, representative dates (e.g., start dates) of respective phases are shown together with a phase flow and outlines acquired by the outline acquiring unit 32 are attached to respective (small) classification items. By generating information indicating a history of phase transitions in this manner, users are allowed to easily recognize how each classification item progressed.

When, as shown in FIG. 7, plural topics occurred in one classification item and plural small classification items corresponding to the respective topics were recognized, the transition index acquiring unit 28 can acquire transition indices of the respective small classification items as well as a transition index of the original classification item containing the small classification items. In this case, the community information generating unit 34 can generate display information corresponding to one or both of the transition indices of the respective small classification items and the transition index of the original classification item when necessary (e.g., in response to a request from a client terminal 14).

The server computer 12 is equipped with a control unit (CPU or the like), storage units (memory, hard disk drive, etc.), input units (mouse, keyboard, microphone, etc.), and output units (display, speaker, printer, etc.) (none of those units are shown). Each of the above-described pieces of processing by the community server 22 is performed by the control unit (CPU; not shown) according to a software program that is retained by a program retaining unit such as the hard disk drive or the memory (not shown). The software program is installed and retained by the program retaining unit after being read from a computer-readable storage medium by a removable device (CD-ROM device, MO device, or the like; not shown). The same is true of the processing of the web server 18 or the mail server 20.

Although the preferred embodiment of the invention has been described above, the embodiment is just an example. The invention is not limited to the embodiment and various modifications are possible.

Other preferred embodiments of the invention are as follows:

(1) In the information providing system of the invention, the transition index acquiring unit acquires transition indices on the basis of histories of the access frequencies, respectively;

(2) In the information providing system of the invention, the transition index acquiring unit acquires transition indices on the basis of read access frequencies and write access frequencies, respectively;

(3) In the information providing system of the invention, the transition index acquiring unit acquires transition indices further on the basis of attributes of parties who made respective accesses;

(4) In the information providing system of the invention, the transition index acquiring unit acquires transition indices corresponding to at least an access frequency increasing, peak, and decreasing phases, respectively;

(5) In the information providing system of the invention, the information generating unit generates prescribed information so that the display will be performed in the client terminal in such a form that display elements corresponding to the respective transition indices are added; and (6) In the information providing system of the invention, the information generating unit generates prescribed information so that pieces of information of plural classification items will be displayed in the client terminal in order that is determined by the transition indices.

The entire disclosure of Japanese Patent Application No. 2003-322479 filed on Sep. 16, 2003 including specification, claims, drawings and abstract is incorporated herein by reference in its entirety.

What is claimed is:

1. An information providing system comprising:
   an information storage unit that stores pieces of information that are classified on the basis of relationships between them;
   an information providing unit that provides a client terminal with information stored in the information storage unit via a communication network in response to an access request from the client terminal;
   an access frequency acquiring unit that acquires access frequencies, for respective classification items of the pieces of information, of accesses to the pieces of information; and
   an information generating unit that generates prescribed information so that pieces of information of the plurality of classification items will be displayed in the client terminal in such a form as to be based on the distribution of the access frequencies over predetermined periods of time.

2. An information providing system comprising:
   an information storage unit that stores pieces of information that are classified on the basis of relationships between them;
   an information providing unit that provides a client terminal with information stored in the information storage unit via a communication network in response to an access request from the client terminal;
   a transition index acquiring unit that acquires transition indices, wherein the transition index indicates the transition phase of at least one of classification items and pieces of information, wherein the transition phase is based on the distribution of the access frequencies over predetermined periods of time; and
   an information generating unit that generates prescribed information so that display will be performed in the client terminal in such a form as to be based on the transition indices.

3. The information providing system according to claim 2, wherein the transition index acquiring unit acquires transition indices on the basis of histories of the access frequencies, respectively.

4. The information providing system according to claim 3, wherein the transition index acquiring unit acquires transition indices on the basis of read access frequencies and write access frequencies, respectively.

5. The information providing system according to claim 4, wherein the transition index acquiring unit acquires transition indices further on the basis of attributes of parties who made respective accesses.

6. The information providing system according to claim 5, wherein the transition index acquiring unit acquires transition indices corresponding to at least an access frequency increasing, peak, and decreasing phases, respectively.

7. The information providing system according to claim 6, wherein the information generating unit generates prescribed information so that the display will be performed in the client terminal in such a form that display elements corresponding to the respective transition indices are added.

8. The information providing system according to claim 7, wherein the information generating unit generates prescribed information so that pieces of information of the plurality of classification items will be displayed in the client terminal in order that is determined by the transition indices.

9. An information providing method that is practiced on an information providing system for providing each client terminal with prescribed information from a server apparatus via a communication network, the information providing method comprising the steps of:
   storing pieces of information, in an information storage unit, that are classified on the basis of relationships between them;
   providing a client terminal, in an information providing unit, with information stored in the information storage unit via the communication network in response to an access request from the client terminal;
   acquiring transition indices in a transition index acquiring unit wherein the transition index indicates the transition phase of at least one of classification items and pieces of information, wherein the transition phase is based on the distribution of the access frequencies over predetermined periods of time; and
   generating prescribed information in an information generating unit so that display will be performed in the client terminal in such a form as to be based on the transition indices.

10. A storage medium readable by a computer, the storage medium storing a program of instructions executable by the computer in an information providing system for providing each client terminal with prescribed information from a server apparatus via a communication network, the program causing the computer to function as:
   an information storage unit that stores pieces of information that are classified on the basis of relationships between them;
   an information providing unit that provides a client terminal with information stored in the information storage unit via the communication network in response to an access request from the client terminal;
   a transition index acquiring unit that acquires transition indices wherein the transition index indicates the transition phase of at least one of classification items and pieces of information, wherein the transition phase is based on the distribution of the access frequencies over predetermined periods of time; and
   an information generating unit that generates prescribed information so that display will be performed in the client terminal in such a form as to be based on the transition indices.

* * * * *